(12) United States Patent
Zhou

(10) Patent No.: US 11,250,233 B2
(45) Date of Patent: Feb. 15, 2022

(54) FINGERPRINT DRIVING CIRCUIT AND DISPLAY PANEL

(71) Applicant: WUHAN CHINA STAR OPTOELECTRONICS TECHNOLOGY CO., LTD, Wuhan (CN)

(72) Inventor: Yongxiang Zhou, Wuhan (CN)

( * ) Notice: Subject to any disclaimer, the term of this patent is extended or adjusted under 35 U.S.C. 154(b) by 0 days.

(21) Appl. No.: 16/970,630

(22) PCT Filed: Jun. 23, 2020

(86) PCT No.: PCT/CN2020/097715
§ 371 (c)(1),
(2) Date: Aug. 18, 2020

(65) Prior Publication Data
US 2021/0383090 A1 Dec. 9, 2021

(30) Foreign Application Priority Data
Jun. 9, 2020 (CN) .......................... 202010516236.6

(51) Int. Cl.
*G06K 9/00* (2006.01)
*G09G 3/20* (2006.01)
(52) U.S. Cl.
CPC ........... *G06K 9/00013* (2013.01); *G09G 3/20* (2013.01); *G09G 2310/0291* (2013.01)

(58) Field of Classification Search
CPC ................ G06K 9/00013; G09G 3/20; G09G 2310/0291
See application file for complete search history.

(56) References Cited

U.S. PATENT DOCUMENTS

| | | | |
|---|---|---|---|
| 2008/0055451 A1* | 3/2008 | Kanbe .................. | H04N 5/3728 348/311 |
| 2016/0180619 A1* | 6/2016 | Riedijk .............. | G01R 27/2605 324/679 |
| 2016/0275331 A1* | 9/2016 | Cheng ................. | H01L 27/0922 |
| 2017/0161539 A1* | 6/2017 | Lo ...................... | G06K 9/00053 |
| 2017/0308730 A1* | 10/2017 | Sundblad ................ | G06K 9/03 |
| 2019/0237591 A1* | 8/2019 | Cheng .................... | H01L 31/10 |

* cited by examiner

Primary Examiner — Stephen G Sherman

(57) ABSTRACT

A fingerprint driving circuit and a display panel are provided. A first stage of amplifying unit is configured to receive a fingerprint voltage, perform a voltage amplifying process on the fingerprint voltage, and output the fingerprint voltage on which the voltage amplifying process has been performed. A second stage of amplifying unit is configured to receive the fingerprint voltage on which the voltage amplifying process has been performed, perform a current and power amplifying process on the fingerprint voltage on which the voltage amplifying process has been performed, and output the fingerprint voltage on which the current and power amplifying process has been performed. A voltage difference between a valley and a ridge of a fingerprint is amplified, so that the signal can be read out easily and correctly and the output ability of the signal is enhanced.

20 Claims, 4 Drawing Sheets

FINGERPRINT DRIVING CIRCUIT AND DISPLAY PANEL

TECHNICAL FIELD

The present disclosure relates to a fingerprint identification technology field, and more particularly to a fingerprint driving circuit and a display panel.

BACKGROUND

Fingerprints are innate, unique and unchanged features of a human body which can be distinguished from others. Patterns of fingerprints are unique and composed of a series of ridges and valleys on surfaces of skins of fingertips. Fingerprint identification technology developed from the fingerprints is technology which is earlier used for personal identification technology.

Nowadays, science and technology are developed rapidly. Electronic products, such as mobile phones, computers and televisions, are widely used in all aspects of life. Accordingly, liquid crystal display panels and organic light emitting diode (OLED) display panels are widely used, and the fingerprint identification serving as a common application is also widely used. With the development of full screen displays, a fingerprint identification module is required to be integrated into a panel. That is, besides thin film transistors (TFT) required for display, a display area (AA) of a panel further has to add a fingerprint sensor and a fingerprint driving circuit therein.

Please refer to FIG. 1 illustrating a circuit diagram of a conventional fingerprint driving circuit. The conventional fingerprint driving circuit includes a first thin film transistor NT11 and a second thin film transistor NT12. A gate of the first thin film transistor NT11 is configured to receive a fingerprint voltage V1. A first terminal of the first thin film transistor NT11 is accessed to a stable voltage source VDD. A second terminal of the first thin film transistor NT11 is accessed to a data readout line RD. A gate of the second thin film transistor NT12 is configured to receive a high-level voltage VGH. A first terminal of the second thin film transistor NT12 is accessed to the data readout line RD. A second terminal of the second thin film transistor NT12 is accessed to a common voltage VSS. The second thin film transistor NT12 serves as a current source. The circuit can amplify a current and power and is mainly configured to enhance driving ability of a driving fingerprint signal, so that an electrical signal corresponding to the fingerprint voltage can be correctly transmitted to an IC via the data readout line RD. However, a voltage difference of the circuit is decreased slightly. Theoretically, an amplifying factor of a highest voltage is smaller 1, and thus there is no voltage gain.

However, since a voltage difference between a signal of a valley of a fingerprint and a signal of a ridge of the fingerprint is very small, it is difficult to distinguish the signal of the valley of the fingerprint and the signal of the ridge of the fingerprint. This brings a great challenge for readout of the IC. Taking an optical fingerprint identification module for example. When light irradiates the valley and the ridge of the fingerprint, different electrical signals are generated and reflected to a photosensitive diode. Since photo-response of the photosensitive diode is weak, the voltage difference is small. The signals are lost slightly after passing a larger RC loading. In the meantime, interferences of noises exist, so that it is very difficult to correctly read out the electrical signals of the valley and the ridge of the fingerprint.

SUMMARY OF DISCLOSURE

Embodiments of the present disclosure provide a fingerprint driving circuit and a display panel to implement amplifying of a voltage difference between a valley of a fingerprint and a ridge of the fingerprint, increasing of driving ability, and increasing of readout accuracy.

An embodiment of the present disclosure provides a fingerprint driving circuit. The circuit includes: a first stage of amplifying unit configured to receive a fingerprint voltage, perform a voltage amplifying process on the fingerprint voltage, and output the fingerprint voltage on which the voltage amplifying process has been performed; wherein the first stage of amplifying unit includes a first transistor, a control terminal of the first transistor configured to receive the fingerprint voltage, a first terminal of the first transistor configured to receive a first voltage, and a second terminal of the first transistor accessed to an output terminal of the first stage of amplifying unit; and a second transistor, a control terminal of the second transistor configured to receive a second voltage, a first terminal of the second transistor accessed to the output terminal of the first stage of amplifying unit, a second terminal of the second transistor configured to receive a third voltage, and the third voltage greater than the first voltage; and a second stage of amplifying unit electrically connected to the first stage of amplifying unit and configured to receive the fingerprint voltage on which the voltage amplifying process has been performed, perform a current and power amplifying process on the fingerprint voltage on which the voltage amplifying process has been performed, and output the fingerprint voltage on which the current and power amplifying process has been performed, wherein the second stage of amplifying unit includes a third transistor, a control terminal of the third transistor configured to receive the fingerprint voltage on which the voltage amplifying process has been performed, a first terminal of the third transistor configured to receive a fourth voltage, and a second terminal of the third transistor accessed to an output terminal of the second stage of amplifying unit; and a fourth transistor, a control terminal of the fourth transistor configured to receive a fifth voltage, a first terminal of the fourth transistor accessed to the output terminal of the second stage of amplifying unit, a second terminal of the fourth transistor configured to receive a sixth voltage, and the fourth voltage greater than the sixth voltage.

An embodiment of the present disclosure further provides a fingerprint driving circuit. The circuit includes: a first stage of amplifying unit configured to receive a fingerprint voltage, perform a voltage amplifying process on the fingerprint voltage, and output the fingerprint voltage on which the voltage amplifying process has been performed; and a second stage of amplifying unit electrically connected to the first stage of amplifying unit and configured to receive the fingerprint voltage on which the voltage amplifying process has been performed, perform a current and power amplifying process on the fingerprint voltage on which the voltage amplifying process has been performed, and output the fingerprint voltage on which the current and power amplifying process has been performed.

An embodiment of the present disclosure further provides a display panel including an array substrate. The array substrate includes at least one fingerprint driving circuit. The fingerprint driving circuit includes: a first stage of amplifying unit configured to receive a fingerprint voltage, perform a voltage amplifying process on the fingerprint voltage, and output the fingerprint voltage on which the voltage amplifying process has been performed; and a second stage of amplifying unit electrically connected to the first stage of amplifying unit and configured to receive the fingerprint voltage on which the voltage amplifying process has been performed, perform a current and power amplifying process on the fingerprint voltage on which the voltage amplifying process has been performed, and output the fingerprint voltage on which the current and power amplifying process has been performed.

Advantageous effect is described as follows. In the fingerprint driving circuit of the present disclosure, the voltage difference between the valley and the ridge of the fingerprint is amplified, so that the signal can be read out easily and correctly and the output ability of the signal is enhanced. Accordingly, the fingerprint voltage signal can be outputted to an IC, the readout accuracy is increased. A structure of the circuit is simple. Required TFTs and signal lines are fewer. It is beneficial for in-plane integration and increasing of an in-plane aperture ratio.

BRIEF DESCRIPTION OF DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and those skilled in the art may still derive other drawings from these accompanying drawings without creative efforts.

DETAILED DESCRIPTION OF EMBODIMENTS

Figure 1:
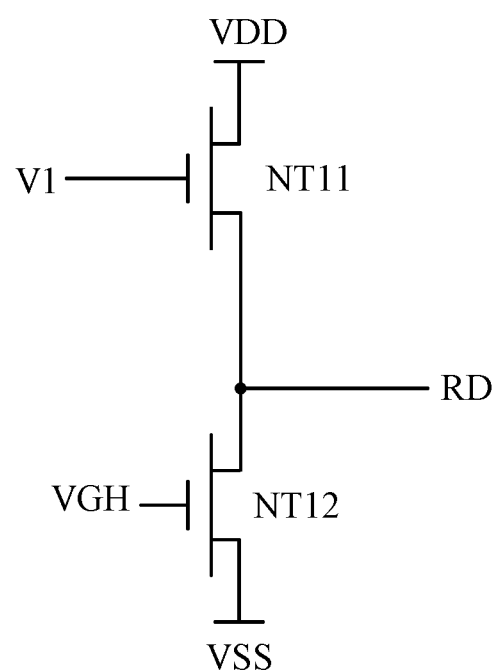
FIG. 1 illustrates a circuit diagram of a conventional fingerprint driving circuit.

Hereinafter, exemplary embodiments of the present disclosure will be described with reference to the accompanying drawings. The same or similar elements or the elements with the same or similar functions will be designated by the same or similar reference numerals throughout the following description and drawings. The terms "first", "second" and "third" (if it exists) are used for distinguishing similar objects but not used for describing a specific sequence or precedence. It should be understood that the described objects may be interchanged. In the description of the present disclosure, the term "more" refers two or more than two, unless otherwise specifically defined. Moreover, the terms "comprising", "having", or variants thereof are intended to cover a non-exclusive inclusion. In the description of the present disclosure, directional terms "upper", "lower", "left", "right", "front", "rear", "inside", "outside", and "side" are only used with reference to directions of the drawings.

In the description of the present disclosure, it should be noted that unless otherwise clearly defined and limited, the terms "mounted", "connected/coupled", and "connection" should be interpreted broadly. For example, the terms may refer to an electrical connection or communication with each other; the terms may further refer to a direct connection, an indirect connection through an intermediary, or an interconnection between two elements or interactive relationship between two elements. It should be understood that when one element is coupled to another element, an intermediary element exists. Those skilled in the art can understand the specific meanings of the above-mentioned terms in the present disclosure according to circumstances.

Researches find that electrical signals generated by a fingerprint sensor are very weak and a voltage difference between a valley and a ridge of a fingerprint is very small. Accordingly, two problems required to be solved exist in a fingerprint driving circuit. In a first problem, enough driving ability should be guaranteed, so that signals of the fingerprint sensor can be transmitted to an IC and read out correctly. In a second problem, the voltage difference between the valley and the ridge of the fingerprint is amplified, so that the voltage difference can be identified.

As such, the present disclosure provides a fingerprint driving circuit adopting two stages of amplifying circuits. In a first stage of the amplifying circuits, a common-drain structure is used, has stronger voltage amplifying ability, and is configured to amplify a fingerprint voltage and then output. In a second stage of the amplifying circuits, a common-source structure is used, has stronger current and power amplifying ability, and is configured to amplify a current and power of the fingerprint voltage and then output. The present disclosure amplifies the voltage difference between the valley and the ridge of the fingerprint, so that the signals can be read out more correctly and output ability of the signals can be increased. As such, the fingerprint voltage signal can be outputted to the IC to increase accuracy of readout.

Figure 2:
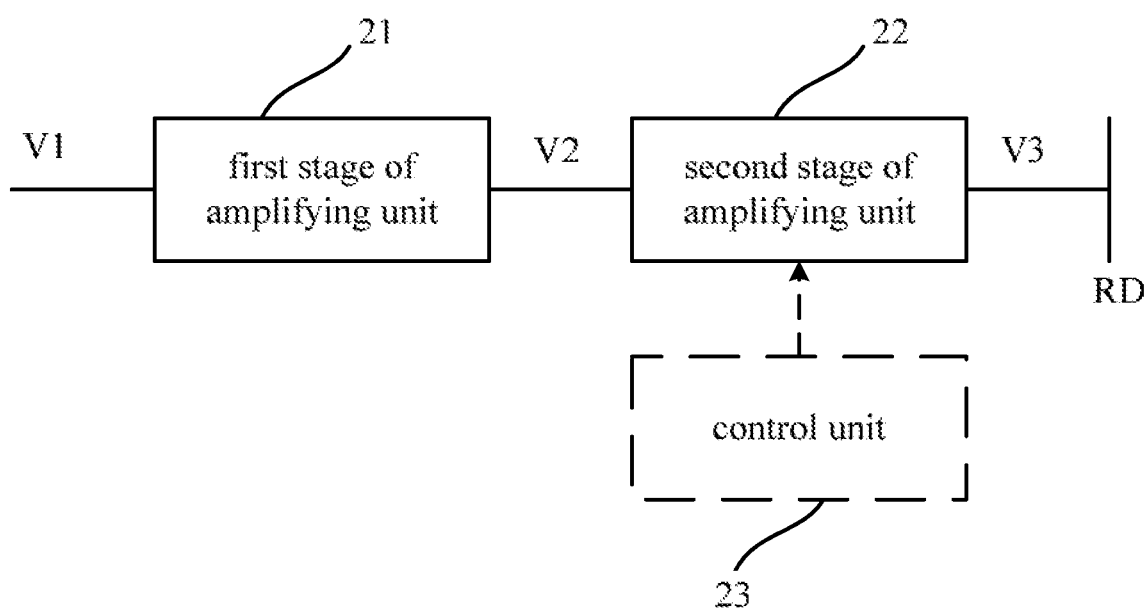
FIG. 2 illustrates an architecture diagram of a fingerprint driving circuit of the present disclosure.

Please refer to FIG. 2 illustrating an architecture diagram of a fingerprint driving circuit of the present disclosure. The fingerprint driving circuit includes a first stage of amplifying unit 21 and a second stage of amplifying unit 22.

The first stage of amplifying unit 21 is configured to receive a fingerprint voltage V1, perform a voltage amplifying process on the fingerprint voltage V1, and output the fingerprint voltage V1 on which the voltage amplifying process has been performed (denoted as a fingerprint voltage V2). The second stage of amplifying unit 22 is electrically connected to the first stage of amplifying unit 21 and configured to receive the fingerprint voltage V2, perform a current and power amplifying process on the fingerprint voltage V2, and output the fingerprint voltage V2 on which the current and power amplifying process has been performed (denoted as a fingerprint voltage V3), so that a corresponding IC can perform a readout operation via a data readout line RD.

In a further embodiment, the fingerprint driving circuit further includes a control unit 23 (a dotted-line block means that the control unit 23 is an optional element). The control unit 23 is configured to control an output of the second stage of amplifying unit 22 in response to a fingerprint voltage readout signal. In detail, when a voltage signal is required to be read out, the control unit 23 controls an output channel of the second stage of amplifying unit 22 to be turned on. When readout of the voltage signal ends, the control unit 23 controls the output channel of the second stage of amplifying unit 22 to be turned off. The readout of the fingerprint driving circuit ends, so that other fingerprint driving circuits are not affected to increase reliability of the readout signal.

In the present disclosure, the voltage difference between the valley and the ridge of the fingerprint is amplified by the voltage amplifying process, so that the signal can be read out easily and correctly to improve the problem that the voltage difference is small. The output ability of the signal is enhanced by the current and power amplifying process, so that the fingerprint voltage signal can be outputted to the IC, the readout accuracy is increased, and the problem that driving ability is insufficient due to the signal generated by the fingerprint sensor is small can be improved.

Figure 3:
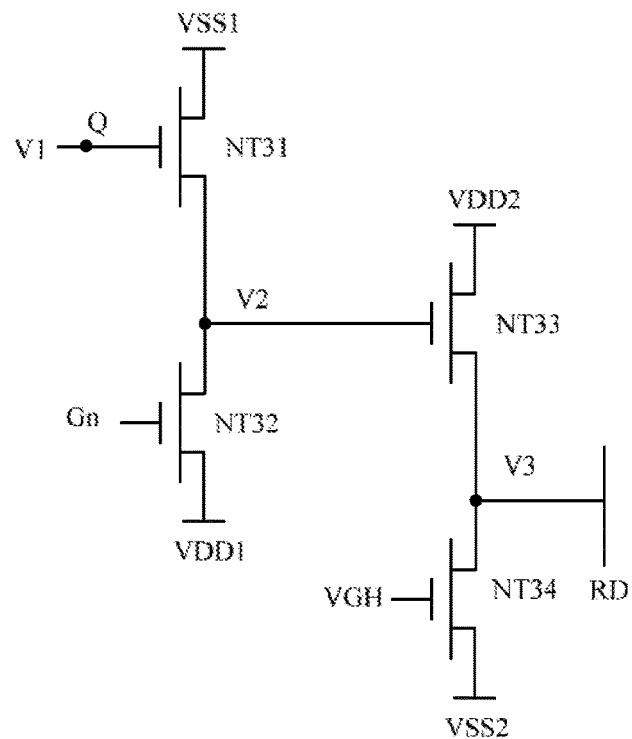
FIG. 3 illustrates a circuit diagram of the fingerprint driving circuit in accordance with a first embodiment of the present disclosure.

Please refer to FIG. 3 illustrating a circuit diagram of the fingerprint driving circuit in accordance with a first embodiment of the present disclosure. In the fingerprint driving circuit, the first stage of amplifying unit 21 includes a first transistor NT31 and a second transistor NT32. The second stage of amplifying unit 22 includes a third transistor NT33 and a fourth transistor NT34.

A control terminal of the first transistor NT31 is configured to receive a fingerprint voltage V1. A first terminal of the first transistor NT31 is configured to receive a first voltage VSS1, and a second terminal of the first transistor NT31 is accessed to an output terminal of the first stage of amplifying unit 21. A control terminal of the second transistor NT32 is configured to receive a second voltage Gn. A first terminal of the second transistor NT32 is accessed to the output terminal of the first stage of amplifying unit 21, and a second terminal of the second transistor NT32 is configured to receive a third voltage VDD1. The output terminal of the first stage of amplifying unit 21 outputs the fingerprint voltage V1 on which the voltage amplifying process has been performed (denoted as the fingerprint voltage V2). The third voltage VDD1 is greater than the first voltage VSS1. This voltage configuration can amplify the voltage difference, so that a voltage amplifying function can be implemented.

In a further embodiment, the first transistor NT31 and the second transistor NT32 are thin film transistors. For example, the first transistor NT31 and the second transistor NT32 may be low temperature poly-silicon thin film transistors (LTPS TFT). Gate terminals of the thin film transistors serve as the control terminals of the corresponding transistors.

In a further embodiment, the first transistor NT31 and the second transistor NT32 are NMOS transistors, constitute a common-drain structure amplifying circuit, and have stronger voltage amplifying ability.

In a further embodiment, a voltage amplifying factor of the first stage of amplifying unit 21 can be regulated by adjusting a width/length ratio (W/L) of the first transistor NT31 and/or a width/length ratio (W/L) of the second transistor NT32 when the first transistor NT31 and the second transistor NT32 are thin film transistors. When the width/length ratio (W/L) of the first transistor NT31 is greater, the voltage amplifying factor is greater. When the width/length ratio (W/L) of the second transistor NT32 is smaller, the voltage amplifying factor is greater. That is, the current and an equivalent resistance are controlled by adjusting sizes of the transistors, thereby implementing different voltage divider ratios and adjusting the outputted voltage.

In a further embodiment, the first transistor NT31 can be controlled to work in a subthreshold region to improve amplifying effect of the first transistor NT31. As such, a voltage change of the gate terminal (Q point in FIG. 3) can generate a more apparent current change. That is, the voltage change of Vgs in the subthreshold region causes the current change of Ids to be more apparent. Correspondingly, a voltage difference of a gate terminal of the third transistor NT33 is greater, so that the readout voltage difference is also greater.

In a further embodiment, the second voltage Gn is equal to the third voltage VDD1. That is, the control terminal of the second transistor NT32 is short-circuited to the second terminal of the second transistor NT32. The control terminal and the second terminal of the second transistor NT32 receive the third voltage VDD1. As such, only one voltage signal line is required, thereby saving one signal line and circuit layout space in the panel and increasing an in-plane aperture ratio.

A control terminal of the third transistor NT33 is configured to receive the fingerprint voltage V2. A first terminal of the third transistor NT33 is configured to receive a fourth voltage VDD2, and a second terminal of the third transistor NT33 is accessed to an output terminal of the second stage of amplifying unit 22. A control terminal of the fourth transistor NT34 is configured to receive a fifth voltage VGH. A first terminal of the fourth transistor NT34 is accessed to the output terminal of the second stage of amplifying unit 22, and a second terminal of the fourth transistor NT34 is configured to receive a sixth voltage VSS2. The output terminal of the second stage of amplifying unit 22 is accessed to a data readout line RD and configured to output the fingerprint voltage V2 on which the current and power amplifying process has been performed (denoted as the fingerprint voltage V3). The fourth voltage VDD2 is greater than the sixth voltage VSS2. This voltage configuration can amplify the current and the power, so that a current and power amplifying function can be implemented. The fifth voltage VGH is a high-level voltage and greater than the fourth voltage VDD2 which is a mains voltage. The fourth transistor NT34 can provide a constant power source for the second stage of amplifying unit 22 and perform a voltage division operation on the third transistor NT33.

In a further embodiment, the fourth voltage VDD2 is equal to the third voltage VDD1. That is, the first terminal of the third transistor NT33 and the second terminal (and the control terminal) of the second transistor NT32 are accessed to the same voltage signal line, thereby saving one signal line and the circuit layout space in the panel and increasing the in-plane aperture ratio.

In a further embodiment, the sixth voltage VSS2 is equal to the first voltage VSS1. That is, the second terminal of the fourth transistor NT34 and the first terminal of the first transistor NT31 are accessed to the same voltage signal line, thereby saving one signal line and the circuit layout space in the panel and increasing the in-plane aperture ratio.

In a further embodiment, the third transistor NT33 and the fourth transistor NT34 are thin film transistors. Gate terminals of the thin film transistors serve as the control terminals of the corresponding transistors.

In a further embodiment, the third transistor NT33 and the fourth transistor NT34 are NMOS transistors, constitute a common-source structure amplifying circuit, and have stronger current and power amplifying ability. As such, the fingerprint voltage signal can be outputted to the IC to increase accuracy of readout.

Figure 4:
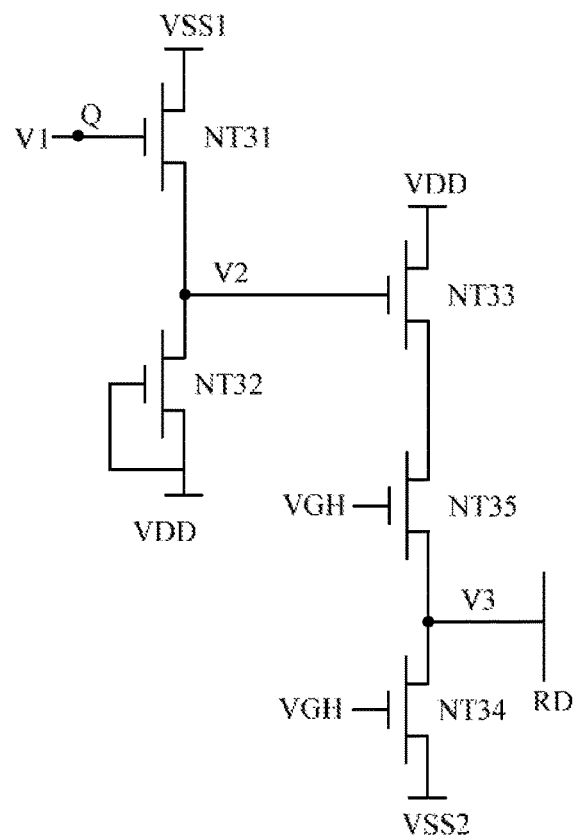
FIG. 4 illustrates a circuit diagram of the fingerprint driving circuit in accordance with a second embodiment of the present disclosure.

Please refer to FIG. 4 illustrating a circuit diagram of the fingerprint driving circuit in accordance with a second embodiment of the present disclosure. A difference between the embodiment in FIG. 3 and the present embodiment is that in the present embodiment, the fingerprint driving circuit further includes a fifth transistor NT35. A control terminal of the fifth transistor NT35 is configured to receive a fingerprint voltage readout signal (the fifth voltage VGH in the present embodiment). A first terminal of the fifth transistor NT35 is electrically connected to the second terminal of the third transistor NT33, and a second terminal of the fifth transistor NT35 is accessed to the output terminal of the second stage of amplifying unit 22 (that is, the second terminal of the fifth transistor NT35 is electrically connected to the first terminal of the fourth transistor NT34). When the signal is required to be read out, the fifth transistor NT35 is turned on. When readout of the voltage signal ends, the fifth transistor NT35 is turned off. The readout of the fingerprint driving circuit ends, so that other fingerprint driving circuits are not affected to increase reliability of the readout signal. That is, the fifth transistor NT35 constitutes the above-mentioned the control unit 23 and is configured to control the output of the second stage of amplifying unit 22 in response to the fingerprint voltage readout signal.

In a further embodiment, the control terminal of the second transistor NT32 is short-circuited to the second terminal of the second transistor NT32. The control terminal and the second terminal of the second transistor NT32 receive the same voltage VDD. As such, only one voltage signal line is required, thereby saving one signal line and circuit layout space in the panel and increasing the in-plane aperture ratio.

In a further embodiment, the first terminal of the third transistor NT33 also receives the voltage VDD, thereby saving one signal line and increasing the in-plane aperture ratio.

Based on the same idea, the present disclosure further provides a display panel.

Figure 5:
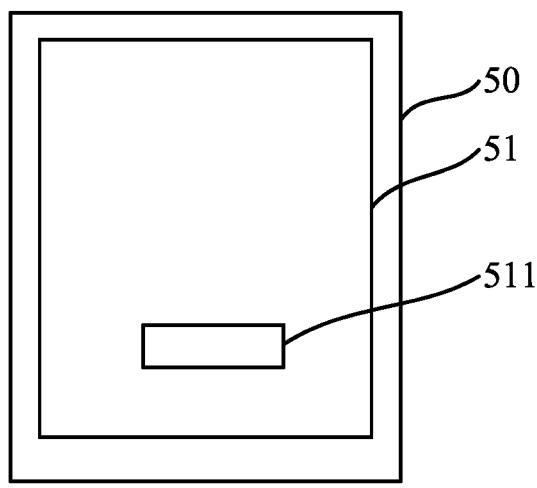
FIG. 5 illustrates an architecture diagram of a display panel of the present disclosure.

Please refer to FIG. 5 illustrating an architecture diagram of the display panel of the present disclosure. The display panel 50 includes an array substrate 51. The array substrate 51 includes at least one fingerprint driving circuit 511. The fingerprint driving circuit 511 adopts any one of the fingerprint driving circuits in FIGS. 2-4. Connections of circuit elements and operating principles of the fingerprint driving circuit 511 are described above and not repeated herein.

In the display panel adopting the fingerprint driving circuit of the present disclosure, the voltage difference between the valley and the ridge of the fingerprint is amplified, so that the signal can be read out easily and correctly and the output ability of the signal is enhanced. Accordingly, the fingerprint voltage signal can be outputted to the IC, the readout accuracy is increased. A structure of the circuit is simple. Required TFTs and signal lines are fewer. It is beneficial for in-plane integration and increasing of the in-plane aperture ratio.

It should be understood that the present disclosure is not limited to the exemplary examples. Those skilled in the art may achieve equivalent improvements or replacements according to the above description. The equivalent improvements and replacements should be considered to belong to the protection scope of the present disclosure.

What is claimed is:

1. A fingerprint driving circuit, wherein the circuit comprises:
   a first stage of amplifying unit configured to receive a fingerprint voltage, perform a voltage amplifying process on the fingerprint voltage, and output the fingerprint voltage on which the voltage amplifying process has been performed; wherein the first stage of amplifying unit comprises a first transistor, a control terminal of the first transistor configured to receive the fingerprint voltage, a first terminal of the first transistor configured to receive a first voltage, and a second terminal of the first transistor accessed to an output terminal of the first stage of amplifying unit; and a second transistor, a control terminal of the second transistor configured to receive a second voltage, a first terminal of the second transistor accessed to the output terminal of the first stage of amplifying unit, a second terminal of the second transistor configured to receive a third voltage, and the third voltage greater than the first voltage; and
   a second stage of amplifying unit electrically connected to the first stage of amplifying unit and configured to receive the fingerprint voltage on which the voltage amplifying process has been performed, perform a current and power amplifying process on the fingerprint voltage on which the voltage amplifying process has been performed, and output the fingerprint voltage on which the current and power amplifying process has been performed, wherein the second stage of amplifying unit comprises a third transistor, a control terminal of the third transistor configured to receive the fingerprint voltage on which the voltage amplifying process has been performed, a first terminal of the third transistor configured to receive a fourth voltage, and a second terminal of the third transistor accessed to an output terminal of the second stage of amplifying unit; and a fourth transistor, a control terminal of the fourth transistor configured to receive a fifth voltage, a first terminal of the fourth transistor accessed to the output terminal of the second stage of amplifying unit, a second terminal of the fourth transistor configured to receive a sixth voltage, and the fourth voltage greater than the sixth voltage.

2. The circuit of claim 1, wherein the second voltage, the fourth voltage, and the third voltage are the same.

3. The circuit of claim 1, wherein the sixth and the first voltage are the same.

4. The circuit of claim 1, wherein the first transistor and the second transistor are thin film transistors, and a voltage amplifying factor of the first stage of amplifying unit is regulated by adjusting a width/length ratio of the first transistor and/or a width/length ratio of the second transistor.

5. The circuit of claim 1, wherein the first transistor and the second transistor are thin film transistors, and the first transistor works in a subthreshold region.

6. The circuit of claim 1, wherein the third transistor and the fourth transistor are thin film transistors.

7. The circuit of claim 1, wherein the circuit further comprises:
   a fifth transistor, a control terminal of the fifth transistor is configured to receive a fingerprint voltage readout signal, a first terminal of the fifth transistor is electrically connected to the second terminal of the third transistor, and a second terminal of the fifth transistor is accessed to the output terminal of the second stage of amplifying unit.

8. A fingerprint driving circuit, wherein the circuit comprises:
   a first stage of amplifying unit configured to receive a fingerprint voltage, perform a voltage amplifying process on the fingerprint voltage, and output the fingerprint voltage on which the voltage amplifying process has been performed; and
   a second stage of amplifying unit electrically connected to the first stage of amplifying unit and configured to receive the fingerprint voltage on which the voltage amplifying process has been performed, perform a current and power amplifying process on the fingerprint voltage on which the voltage amplifying process has been performed, and output the fingerprint voltage on which the current and power amplifying process has been performed.

9. The circuit of claim 8, wherein the first stage of amplifying unit comprises:
a first transistor, a control terminal of the first transistor configured to receive the fingerprint voltage, a first terminal of the first transistor configured to receive a first voltage, and a second terminal of the first transistor accessed to an output terminal of the first stage of amplifying unit; and
a second transistor, a control terminal of the second transistor configured to receive a second voltage, a first terminal of the second transistor accessed to the output terminal of the first stage of amplifying unit, a second terminal of the second transistor configured to receive a third voltage, and the third voltage greater than the first voltage.

10. The circuit of claim 9, wherein the second voltage and the third voltage are the same.

11. The circuit of claim 9, wherein the first transistor and the second transistor are thin film transistors, and a voltage amplifying factor of the first stage of amplifying unit is regulated by adjusting a width/length ratio of the first transistor and/or a width/length ratio of the second transistor.

12. The circuit of claim 9, wherein the first transistor and the second transistor are thin film transistors, and the first transistor works in a subthreshold region.

13. The circuit of claim 8, wherein the second stage of amplifying unit comprises:
a third transistor, a control terminal of the third transistor configured to receive the fingerprint voltage on which the voltage amplifying process has been performed, a first terminal of the third transistor configured to receive a fourth voltage, and a second terminal of the third transistor accessed to an output terminal of the second stage of amplifying unit; and
a fourth transistor, a control terminal of the fourth transistor configured to receive a fifth voltage, a first terminal of the fourth transistor accessed to the output terminal of the second stage of amplifying unit, a second terminal of the fourth transistor configured to receive a sixth voltage, and the fourth voltage greater than the sixth voltage.

14. The circuit of claim 13, wherein the third transistor and the fourth transistor are thin film transistors.

15. The circuit of claim 13, wherein the circuit further comprises:
a fifth transistor, a control terminal of the fifth transistor is configured to receive a fingerprint voltage readout signal, a first terminal of the fifth transistor is electrically connected to the second terminal of the third transistor, and a second terminal of the fifth transistor is accessed to the output terminal of the second stage of amplifying unit.

16. The circuit of claim 8, wherein the circuit further comprises:

a control unit configured to control an output of the second stage of amplifying unit in response to a fingerprint voltage readout signal.

17. A display panel, comprising an array substrate, wherein the array substrate comprises at least one fingerprint driving circuit, and the fingerprint driving circuit comprises:
a first stage of amplifying unit configured to receive a fingerprint voltage, perform a voltage amplifying process on the fingerprint voltage, and output the fingerprint voltage on which the voltage amplifying process has been performed; and
a second stage of amplifying unit electrically connected to the first stage of amplifying unit and configured to receive the fingerprint voltage on which the voltage amplifying process has been performed, perform a current and power amplifying process on the fingerprint voltage on which the voltage amplifying process has been performed, and output the fingerprint voltage on which the current and power amplifying process has been performed.

18. The display panel of claim 17, wherein the first stage of amplifying unit comprises:
a first transistor, a control terminal of the first transistor configured to receive the fingerprint voltage, a first terminal of the first transistor configured to receive a first voltage, and a second terminal of the first transistor accessed to an output terminal of the first stage of amplifying unit; and
a second transistor, a control terminal of the second transistor configured to receive a second voltage, a first terminal of the second transistor accessed to the output terminal of the first stage of amplifying unit, a second terminal of the second transistor configured to receive a third voltage, and the third voltage greater than the first voltage.

19. The display panel of claim 17, wherein the second stage of amplifying unit comprises:
a third transistor, a control terminal of the third transistor configured to receive the fingerprint voltage on which the voltage amplifying process has been performed, a first terminal of the third transistor configured to receive a fourth voltage, and a second terminal of the third transistor accessed to an output terminal of the second stage of amplifying unit; and
a fourth transistor, a control terminal of the fourth transistor configured to receive a fifth voltage, a first terminal of the fourth transistor accessed to the output terminal of the second stage of amplifying unit, a second terminal of the fourth transistor configured to receive a sixth voltage, and the fourth voltage greater than the sixth voltage.

20. The display panel of claim 17, wherein the circuit further comprises:
a control unit configured to control an output of the second stage of amplifying unit in response to a fingerprint voltage readout signal.

* * * * *